INVENTORS
DAVID G. STEPHENS
CLEMANS A. POWELL, JR.
ATTORNEYS

United States Patent Office 3,473,379
Patented Oct. 21, 1969

3,473,379
INSTRUMENT FOR MEASURING THE DYNAMIC BEHAVIOR OF LIQUIDS
David G. Stephens, Yorktown, and Clemans A. Powell, Jr., Hampton, Va., assignors to the United States of America as represented by the Administrator of the National Aeronautics and Space Administration
Filed Jan. 26, 1968, Ser. No. 700,986
Int. Cl. G01f 23/00
U.S. Cl. 73—301       10 Claims

ABSTRACT OF THE DISCLOSURE

An instrument to determine the dynamic behavior of liquid in a tank including a pipe fixed to the tank and extending throughout its height. An inlet of the pipe allows liquid to enter the pipe. A tube placed inside the pipe carries a plurality of pressure transducers, one being exposed to the liquid in the tank, a second exposed to liquid within the pipe, and a third located at the end of the tube below the other transducers. Outputs from the transducers are computed and indicate the simultaneous acceleration of the tank, the amplitude of liquid slosh in the tank, and the depth of liquid in the tank.

---

The invention described herein was developed by employees o fthe United States Government and may be manufactured and used by or for the Government for governmental purposes without the payment of any royalties thereon or therefor.

This invention relates to an instrument which measures the dynamic behavior of liquid in a tank and more particularly to an instrument which will measure dynamic behavior of liquid in a fuel tank subjected to flight conditions.

Several methods have been used for studying slosh characteristics of a liquid under laboratory conditions; however, these techniques are not generally applicable to a liquid-propellant fuel tank under flight conditions.

Prior art methods of observing the dynamic behavior of liquids in a tank include observing either physically or photographically. Although these arrangements are generally satisfactory for static observation, they are not particularly adaptable to flight conditions. If photography is utilized, mechanism to recover the photograph is also necessary resulting in expensive, involved equipment. Furthermore, since the fuel tank is seldom, if ever recovered, additional equipment is necessary to relay the results of the pictures. Television systems also involve substantial equipment and require larger power supplies, all of which are not generally desirable on space missions.

Certain types of electronic equipment have also been utilized to provide information regarding liquid behavior, but this equipment has not proved to be generally suitable for use in closed systems such as a fuel tank since they require frequent replacement and calibration, and are particularly susceptible to corrosion and breakage due to the slosh of the liquid within the tank.

The idea of sensing the acceleration of bodies which float on the surface of the liquid has also been contemplated; however, due to the freedom of motion of these floats, precise measurements are extremely difficult if not impossible.

The invention here under consideration overcomes the abovementioned problems by providing transducers actuated by the behavior of liquid at various levels. The outputs from the transducers are conveyed through a protective system to the exterior of the fuel tank wherein the information is read and interpreted.

It is therefore an object of this invention to provide an instrument for measuring the dynamic behavior of liquid.

A further object of this invention is to provide an instrument for measuring the slosh amplitude of liquid in a fuel tank.

Another object of the invention is to provide an instrument for measuring the acceleration of the fuel tank.

A further object of the invention is to provide instrumentation for measuring the dynamic behavior of liquid in a fuel tank at all levels of fuel in the tank.

An additional object of the invention is to provide instrumentation for mapping the entire surface behavior of liquid in a fuel tank.

Still another object of the invention is to provide an instrument which will measure the depth of liquid in a fuel tank, as well as acceleration and slosh amplitude.

Yet another object of the invention is to provide an instrument for determining the dynamic behavior of a liquid which is of durable construction, not subject to corrosion, is simple to operate and maintain, and that is readily adapted to use in a fuel tank of a liquid-propellant launch vehicle.

These and other objects and advantages of the invention will become more apparent upon reading the specification in conjunction with the accompanying drawings.

In the drawings:
FIG. 1 is a cross sectional view of a fuel tank section showing the instrument for measuring the dynamic behavior of liquid in the tank as it is associated with the tank;

Figure 1:
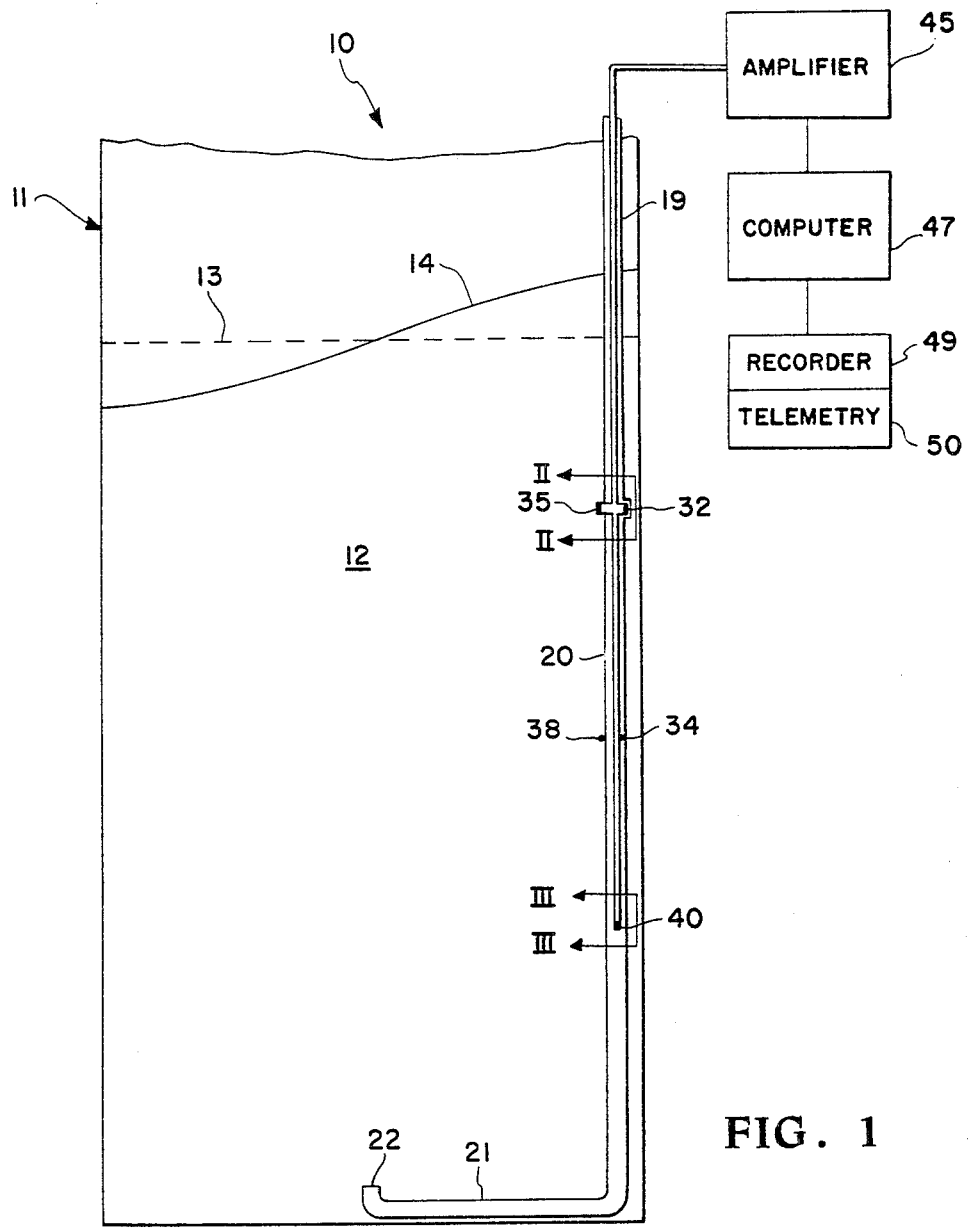

Referring now more specifically to the details of the invention, FIG. 1 illustrates the instrument assembly designated generally by the reference numeral 10.

The assembly 10 is shown in conjunction with a tank or fuel tank 11 containing liquid or fuel 12. It should be understood, however, that the invention has application to any body of liquid, for example, measuring the dynamic behavior of the ocean. The fuel tank 11, for purposes of illustration, has the general configuration of a fuel tank which might be utilized in a liquid-propellant launch vehicle. Such tanks have a depth or height which is usually several times the diameter of the tank, due to the design of the overall vehicle. It is to be understood, however, that the invention has application to tanks of various sizes and shapes.

The dotted line transversing tank 11 is associated with the reference numeral 13 and illustrates the quiescent liquid level in the fuel tank, the line 14 representing a possible surface profile under slosh conditions. Both of these lines are shown to facilitate the description and understanding of the invention.

The instrument, designated generally by the reference numeral 19, includes a pipe 20 which extends from the top to the bottom of the tank. The pipe 20 has a leg 21 which projects at an angle normal thereto along the bottom of the tank. A portion of the extremity of the pipe is turned up and left open providing an inlet 22. Liquid within the tank is thus free to enter inlet 22 and seek the quiescent level 13 within the pipe 20. FIGURE 1 shows only a portion of a tank and therefore only a portion of the pipe 20. Although not shown, brackets or clamps of conventional design would be secured to the side of the tank and to the pipe in a conventional manner to maintain the pipe in the proper position with respect to the tank. The pipe 20 may also be formed of a series of sections joined by couplings, such as the coupling 23, shown in FIGURE 2. The coupling 23 has an offset closure 24 and an opening 25 to accommodate transducers, to be explained more fully hereinafter.

Disposed within the pipe 20 is a tube 28 which is generally concentric with the pipe. The top of the tube 28 would be connected to the tank 11 in a manner such that leads carried by the tube might pass through the wall of the tank to equipment. The lower extremity of the tube extends to a position adjacent the bottom of the tank. The tube 28 is also formed in sections being joined by a cross-shaped union 29. The union 29 is positioned in the tube 28 such that one arm of the union projects into the offset closure 24 of pipe coupling 23, and the other arm thereof projects through the couplings outlet 25.

Differential pressure transducer 32 is connected to the union 29 in a conventional manner such as by welding or a thread connection. The transducer 32 is of conventional design having a diaphragm and strain gage arrangement, this type of transducer being available commercially. A pressure transducer 35 is connected to the other arm of the union 29 and is of the same type as transducer 32. Another transducer 40 is located in the lower end of tube 28 and is also of the same type as the transducers 32 and 35. Leads 33, 36, and 42 from transducers 32, 35 and 40, respectively, travel through the tube 28 to the exterior of the fuel tank carrying the outputs from the strain gages forming a part of the various transducers. These leads are connected to an amplifier 45, which is in turn connected to a computer 47, the output of which may be fed to a recorder 49 and/or telemetry equipment 50. The amplifier, computer, recorder and telemetry equipment are of a conventional design and many types of each device may be obtained commercially.

The pipe 20 contains gas at the ullage pressure, which is the pressure of gas between the liquid and the top of the container.

Additional transducers may be placed at different levels throughout the length of the pipe 20. For example, the points 34 and 38 (FIG. 1) represent additional transducers which may be placed along the pipe. It is to be understood that these transducers might be placed at intervals from the top to the bottom of the pipe to gather information on the dynamic behavior of the liquid in the tank at all levels, this being necessary as the liquid is consumed and drained from the tank.

Figure 5:
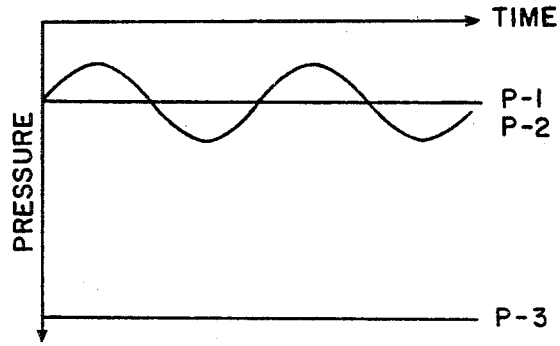
FIG. 5 is a diagram showing the wave form outputs from the various transducers utilized in the instrument.
Figure 4:
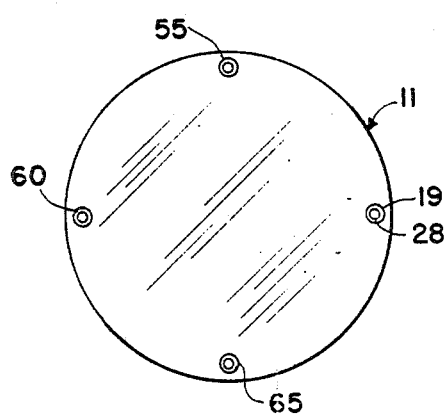
FIG. 4 is a plan view showing schematically the positioning of instruments utilized in mapping the dynamic behavior of the entire surface of liquid in a tank.

FIG. 5 illustrates diagrammatically that instrumentation may be placed at various points about the tank in order to sense the behavior of the entire surface of the liquid. Thus, an instrument similar to the instrument 19 might be placed at each quadrant about the tank 11, the additional instruments 55, 60 and 65 being shown in FIG. 5 of the drawings. These instruments would be similar in construction to the instrument 19.

OPERATION

In describing the operation, it is assumed that the instrument 19 is positioned in a tank and that liquid is at some level in the tank essentially as shown in FIG. 1. The liquid in the tank will seek a level and have a quiescent level line such as 13 under static conditions. The liquid will also enter the inlet 22 and fill the pipe 20 to the quiescent level line. The liquid in pipe 20 will remain at the quiescent level even under slosh conditions.

Figure 2:
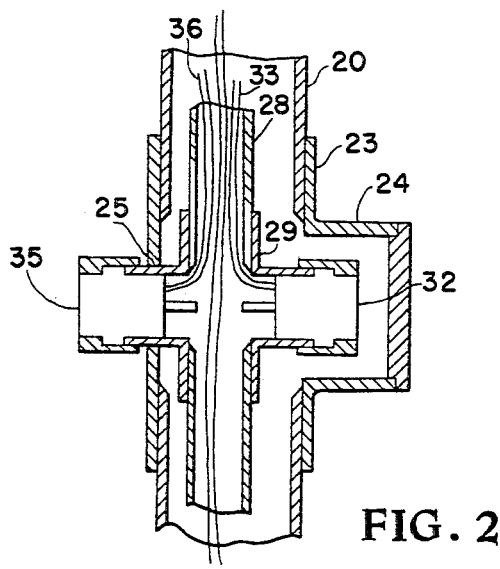
FIG. 2 is a cross sectional view taken along the section lines II—II of FIGURE 1, illustrating the positioning of certain of the transducers utilized in the instrument.
Figure 3:
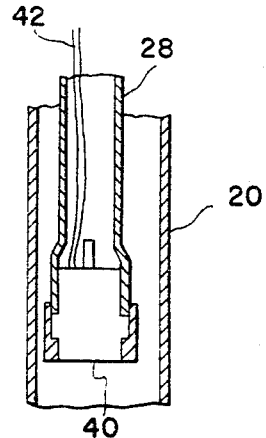
FIG. 3 is a cross sectional view taken along the sectional lines III—III of FIG. 1, showing another transducer and its position in the instrument.

It is believed to be clear from viewing FIGS. 1-3 that the transducer 32 is subjected to the liquid within the pipe 20, that the transducer 35 is subjected to the liquid within the tank, and that transducer 40 is subjected to the liquid in the pipe 20 at a lower level.

Assuming that liquid is agitated, for example, by shaking in a static test, or movement of the entire tank as a result of launch, various outputs are provided from the transducers. The diagram shown in FIG. 5 illustrates the output from each of the transducers. The output from the transducer 32 corresponds with the tracing P-1, the output from the transducer 35 corresponds with the tracing P-2, and the output from the transducer 40 correspond with the tracing P-3. It is apparent from FIG. 5 that the reading from the transducers subjected to the liquid within the pipe remains substantially constant at a given level of liquid. The transducer subjected to the liquid in the tank, however, provides a fluctuating output as shown by tracing P-2. With these relationships, it has been found that the difference between tracing P-3 and P-1 is proportional to the tank acceleration, and is therefore indicative of the acceleration of the tank and liquid. It has further been found that output P-3 is proportional to the depth of liquid in the tank and is therefore indicative of the quiescent liquid level in the tank. The difference between tracings P-2 and P-1 is proportional to the liquid amplitude and is therefore indicative of the degree of slosh. Utilizing known hydrodynamic relationships, the acceleration, depth of liquid and slosh amplitude can be determined. This is accomplished by the computer 47, the output of which is recorded under static test conditions, or under flight conditions may be recorded and relayed by telemetry equipment.

The hydrodynamic relationship is represented by the equation $$P_{max} = P_0 + \rho g z + \rho g \eta \frac{\cosh[1.841(h-z)a^{-1}]}{\cosh(1.841\ ha^{-1})} \sin \omega_1 t \quad (1)$$

where:

$P_0$ ullage pressure
$\rho$ fluid density, slugs/ft.$^3$
$g$ longitudinal acceleration field, ft./sec.$^2$
$\eta$ maximum wave height above quiescent free surface at the tank walls, ft.
$a$ tank radius, ft.
$h$ height of quiescent fluid surface, ft.
$\omega_1$ fundamental slosh frequency
$\sqrt{1.841\ ga^{-1} \tanh 1.841\ ha^{-1}}$, rad/sec.
$z$ distance from quiescent free surface (positive direction downward), ft.

With the outputs from the various transducers, it is a simple matter to solve for the acceleration ($g$), the slosh amplitude ($\eta$), and the depth ($h$), with the aid of Equation 1.

Simplified instrumentation can be utilized to determine slosh amplitude if the liquid depth, acceleration, and transducer location are known such as in laboratory testing. A single pressure transducer, such as transducer 35, is located at a known distance below the quiescent liquid level. The transducer is subjected directly to the liquid in the tank. The pressure fluctuations sensed by the transducer are directly proportional to the amplitude of slosh. Thus by properly calibrating the transducer, the output thereof will provide a direct reading of slosh amplitude.

From the above description of the invention, the many advantages thereof are believed to be readily apparent. The instrument is believed to be the only device of its type which will provide acceleration, slosh amplitude and depth data of a dynamic liquid which is itself being conveyed in a flight vehicle. The instrument is rugged in construction, is of a simple design readily adapted for use in a fuel tank, and is constructed so as to withstand the buffeting of moving liquid and resists its corrosive effect. The instrument has also proven to be extremely accurate and has few parts of minimum weight, thereby being particularly adapted for space flight application.

While a preferred embodiment of the invention has been described, it will be understood that modifications and improvements may be made thereto.

What is claimed as new and desired to be secured by Letters Patent of the United States is:

1. An assembly for measuring the dynamic behavior of liquid or the like comprising:
   a body of liquid;
   a pipe extending into the liquid and being open to said liquid;
   first pressure sensing transducer means positioned in said pipe and being subjected to the liquid therein;
   second pressure sensing transducer means subjected to the liquid surrounding the pipe;
   a tube containing gas at ambient pressure extending into said liquid;
   third pressure sensing transducer means sealingly located on the end of the tube and subjected to said liquid at a depth greater than said first and second transducers;
   means responsive to the outputs of said first, second and third transducer means for calculating the quiescent surface level of the liquid, the amplitude of slosh from said level, and the acceleration of the liquid body.

2. An assembly for measuring the dynamic behavior of liquid or the like as in claim 1 wherein the tube is housed within the pipe.

3. An assembly for measuring the dynamic behavior of liquid or the like as in claim 1 wherein said first and second transducers are located on the same level and said third transducer is located below said first and second transducers.

4. An assembly for measuring the dynamic behavior of liquid or the like as in claim 1 wherein the difference between the outputs of the first and third transducers is indicative of the liquid body acceleration.

5. An assembly for measuring the dynamic behavior of liquid or the like as in claim 1 wherein the difference between the outputs of the first and second transducers is indicative of slosh amplitude.

6. An assembly for measuring the dynamic behavior of liquid or the like as in claim 1 wherein said means for comparing outputs of the transducers includes an amplifier and computer; and recorder and telemetering means for storing and transmitting liquid behavior data from the computer.

7. An assembly for measuring the dynamic behavior of liquid or the like as in claim 1 wherein the output of the third transducer means is indicative of the quiescent liquid level.

8. An assembly for measuring the dynamic behavior of liquid or the like as in claim 1 wherein the body of liquid is in a tank; and additional transducers are located at different levels in the tank to provide outputs at all levels of liquid in the tank.

9. An assembly for measuring the dynamic behavior of liquid or the like as in claim 1 wherein the body of liquid is in a tank, and a plurality of pipes are located at several different positions about the perimeter of the tank, each pipe including first, second and third pressure sensing transducers to map all surface movement within the tank.

10. An assembly for measuring the dynamic behavior of liquid or the like comprising:
    a tank having a depth substantially greater than its diameter;
    a pipe carried by the tank extending from the top to the bottom of the tank;
    said pipe having a leg extending at an angle therefrom along the bottom of the tank;
    an inlet formed in the leg allowing liquid to enter the pipe;
    a tube positioned within said pipe;
    opposing first and second pressure sensitive transducer means mounted on said tube;
    one of said transducers extending through an aperture in said pipe and being subjected to the liquid in said tank;
    the other transducer being subjected to liquid in said pipe;
    a third pressure sensitive transducer sealingly fixed to the bottom of said tube;
    computer means;
    leads from said first, second and third transducer means passing through said tube and being connected to said computer means; and
    said computer means being responsive to the outputs of said first, second and third transducer means for determining acceleration of the tank, depth of liquid and amplitude of liquid slosh.

References Cited

UNITED STATES PATENTS

| | | | |
|---|---|---|---|
| 2,921,469 | 1/1960 | Newton | 73—301 X |
| 3,114,381 | 12/1963 | Klose et al. | 73—299 X |
| 3,269,187 | 8/1966 | Perino | 73—398 |
| 3,364,466 | 1/1968 | Stine | 340—179 X |
| 3,371,534 | 3/1968 | Akeley | 73—299 |

LOUIS R. PRINCE, Primary Examiner

DANIEL M. YASICH, Assistant Examiner